(12) United States Patent
Muscarella (10) Patent No.: US 7,895,599 B2
(45) Date of Patent: Feb. 22, 2011

(54) USER INTERFACE INDEPENDENT REMOTE INTERFACE DATA LOADER

(75) Inventor: Fabrizio Muscarella, Mannheim (DE)

(73) Assignee: SAP AG, Walldorf (DE)

( * ) Notice: Subject to any disclaimer, the term of this patent is extended or adjusted under 35 U.S.C. 154(b) by 944 days.

(21) Appl. No.: 11/752,845

(22) Filed: May 23, 2007

(65) Prior Publication Data

US 2008/0295119 A1    Nov. 27, 2008

(51) Int. Cl.
G06F 3/00   (2006.01)
G06F 9/44   (2006.01)
G06F 9/46   (2006.01)
G06F 13/00  (2006.01)

(52) U.S. Cl. .................. 719/313; 719/314; 719/315; 719/316

(58) Field of Classification Search .......... 719/313–316
See application file for complete search history.

(56) References Cited

U.S. PATENT DOCUMENTS

| | | | |
|---|---|---|---|
| 4,466,065 A | 8/1984 | Advani et al. | |
| 5,781,906 A | 7/1998 | Aggarwal et al. | |
| 5,987,247 A | 11/1999 | Lau | |
| 6,223,145 B1 | 4/2001 | Hearst | |
| 6,314,424 B1 | 11/2001 | Kaczmarski et al. | |
| 6,381,640 B1 | 4/2002 | Beck et al. | |
| 6,393,427 B1 | 5/2002 | Vu et al. | |
| 6,457,065 B1 | 9/2002 | Rich et al. | |
| 6,654,932 B1 * | 11/2003 | Bahrs et al. | 715/210 |
| 6,662,189 B2 | 12/2003 | Oyanagi et al. | |
| 6,675,228 B1 * | 1/2004 | Bahrs et al. | 719/318 |
| 6,748,570 B1 * | 6/2004 | Bahrs et al. | 715/210 |
| 6,760,733 B1 | 7/2004 | Komine et al. | |
| 6,779,155 B1 * | 8/2004 | Bahrs et al. | 715/234 |
| 6,782,508 B1 * | 8/2004 | Bahrs et al. | 715/210 |
| 6,829,771 B1 * | 12/2004 | Bahrs et al. | 719/318 |
| 6,862,686 B1 * | 3/2005 | Bahrs et al. | 726/3 |
| 6,862,711 B1 * | 3/2005 | Bahrs et al. | 715/205 |
| 6,880,126 B1 * | 4/2005 | Bahrs et al. | 715/210 |
| 6,886,170 B1 * | 4/2005 | Bahrs et al. | 719/318 |
| 6,901,554 B1 * | 5/2005 | Bahrs et al. | 715/210 |
| 6,944,830 B2 | 9/2005 | Card et al. | |
| 7,076,742 B1 | 7/2006 | Thorn et al. | |
| 7,181,686 B1 * | 2/2007 | Bahrs | 715/210 |
| 7,346,656 B2 | 3/2008 | Worthen | |
| 7,523,126 B2 | 4/2009 | Rivette et al. | |
| 2009/0171659 A1 * | 7/2009 | Pearce et al. | 704/235 |

OTHER PUBLICATIONS

Final Office Action for U.S. Appl. No. 11/752,847 Mailed Nov. 23, 2009, 17 Pages.
Non-Final Office Action for U.S. Appl. No. 11/752,847; dated Jun. 23, 2009; 27 pages.
Blakely-Fogel, D , et al., ""Generic Database Interface"", IP.com, Mar. 17, 2005; 90A064051, (Mar. 17, 2005).

(Continued)

*Primary Examiner*—Qing Wu
(74) *Attorney, Agent, or Firm*—Blakely Sokoloff Taylor & Zafman (57) ABSTRACT

Methods and apparatuses enable providing asynchronous data loading from a remote or separate interface. A data loader provides a synchronous interface for receiving and queuing requests to execute functions on a distributed object tree. The data loader dequeues and executes the functions asynchronously with respect to the requests for execution. A user interface is asynchronously updated as the execution is performed in a background process.

19 Claims, 4 Drawing Sheets

OTHER PUBLICATIONS

IBM, ""A Method to Provide A Portability Support for an Application Server in a Distributed Object Environment"", IP.com; Jun. 21, 2003; IPCOM000016094D, (Jun. 21, 2003).

IBM, ""Simple Data Exchange Model and Interface Framework"", IP.com; Mar. 8, 2005; IPCOM0000990002, (Mar. 8, 2005).

Knapman, JM, "Generating Specific Server Programs in Distributed Object-Oriented Customer Information Control System", IP.com; Jan. 1, 1995; vol. 38; No. 1, (Jan. 1, 1995).

McGarraham, JR, et al., ""Manage and Store Database Data Definition or Data Model as User Data"", IP.com; Sep. 1, 1995; vol. 38, No. 9, (Sep. 1, 1995).

Post, LL, et al., ""Dynamically Configurable User Interface for the Manipulation of Data Objects"", IP.com; vol. 37, No. 3, Mar. 1, 1994.

Notice of Allowance and Fees for U.S. Appl. No. 11/752,847 Mailed Apr. 15, 2010, 8 Pages.

\* cited by examiner

USER INTERFACE INDEPENDENT REMOTE INTERFACE DATA LOADER

FIELD

Embodiments of the invention relate to remote interfaces, and more particularly to providing asynchronous status and data updates for a request received from a remote interface.

BACKGROUND

The increased use of technology in jobs increases the significance of data access to employees in a wide variety of professions and industries. Data access is typically obtained via computing devices, which are often separate or remote from a device on which the data is stored. The computing devices can thus be considered to have remote interfaces for accessing data. A design criterion to consider in data access systems is whether to have a blocking or non-blocking user interface. A blocking user interface requests data and does not allow control of the user interface until either the data access succeeds, or a timeout occurs. A non-blocking user interface, in contrast, allows a user to perform other functions with the user interface after a request for data access is made, even if the request has not yet succeeded. The user interface, whether block or non-blocking, interfaces with a data access interface that services or executes the request and accesses the data. A non-blocking user interface is generally considered to operate "asynchronously" to the data access interface. A blocking user interface is generally considered to operate "synchronously" to the data access interface.

Although the interfaces are generally considered to be asynchronous or synchronous with respect to each other, the underlying backend data access mechanisms are traditionally synchronous with respect to the data access interface. Thus, a data access request from a user interface is typically processed by the data access interface, and the request executed synchronously with respect to an update mechanism of the remote interface.

Besides being traditionally synchronous in data updating, another challenge to remote interfacing is the traditional dependency of the data access interface on the user interface. The operation of the data access interface traditionally is customized to a particular type of user interface. When designing a data access system, porting data access functionality to a different user interface previously required rebuilding the backend data access interface mechanisms. Thus, the previously known interfaces for monitoring of remote systems have drawbacks in functionality as well as portability.

BRIEF DESCRIPTION OF THE DRAWING

The following description includes discussion of a figure having illustrations given by way of example of implementations of embodiments of the invention. The drawing should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

Methods and apparatuses enable a remote data interface to provide data asynchronously with respect to the data access request. In one embodiment, the remote data interface is modularized and not specific to a particular user interface, enabling more efficient porting to different user interfaces. A client device includes an interface to a backend system, which backend system may include one or more enterprise servers. The enterprise server may in turn be connected to one or more data repositories, and/or other client devices. In a typical enterprise environment, data objects may be distributed throughout the enterprise. Distributed objects include any type of data objects that are or may be distributed through the enterprise system. As referred to herein, a distributed object is an object that can be stored in one location of the enterprise that may be separate from the storage location of another object with which it has a relationship. An object relationship may be any type of relationship or dependency that enables the objects to work together, or be used in conjunction with each other. An example may be configuration data stored on multiple different machines within an enterprise network.

A request for access to data is generated through a user interface, which is passed to a data access interface of a remote or separate device. Data access interface mechanisms as described herein enable asynchronous operation of the data access with respect to the request. A request to perform a function with respect to a distributed object tree is received at the data access interface. The data access interface queues the request and replies to the requesting entity. In one embodiment, the reply is provided or sent synchronously with respect to the request. That is, the request is received and queued, and after queuing the request, the reply is sent. Typically, such an interaction occurs quickly enough that although synchronous, it would likely be imperceptible to a user.

The request is for the performance of a function or operation. Note that it is not uncommon to use the expressions "function" and "operation" as interchangeable. However, simply for purposes of simplicity in description herein, and not by way of limitation, the expression "operation" refers to an atomic element of execution by a processing system, and "function" refers to one or more operations. An atomic element of execution refers to a single executable expression in a programming language of choice, which may itself be compiled to multiple assembly/machine-code instructions. Thus, although operation may commonly refer to one or more operations in normal usage, "function" will refer to one or more operations, which refer to single executable expressions of a high-level programming language. The requested function is queued in an execution queue. In one embodiment, the function is separated into its constituent operations, and each operation is queued for execution. In one embodiment, the operations are queued in an execution order, or the order in which they should be executed. Queuing the operations in execution order may, for example, include placing the operations in execution order and placing them in a first-in first-out (FIFO) queue. Other forms of execution scheduling may be used.

The operations are executed in a background process, which may include opening a background thread for each operation. In one embodiment, the queuing of the operations occurs in a main thread, and the execution of the operations occurs in background threads generated by the main thread. A tree worker node or tree builder or equivalent module may execute one or more of the operations. In one embodiment, execution of one or more operations includes the accessing of a distributed object interface, which may, for example, be a web service interface that accesses a distributed object. As the operation(s) are executed, the background processes can report to one or more asynchronous update modules that interface with the user interface from which the request was generated. The update modules asynchronously provide data and/or status information to the user interface as operations are executed. Thus, the user interface may continue to be active with other tasks, and the data and status are provided as other tasks are being performed within the user interface. The data access mechanisms can provide true asynchronous operation as contrasted to the pseudo-asynchronous operation of traditional systems.

Consider an enterprise system having distributed objects, and having multiple instances of a user interface representing a connection to the backend enterprise system. For example, consider an enterprise system available from SAP AG of Walldorf, Germany, with a user interface, referred to as SAP-Instance. Suppose a function referred to as UpgradeASStatus were created, which would perform the following operations: UpgradeABAPStatus, UpgradeJ2EEStatus, and UpgradeTR-EXStatus. Passing the function UpgradeASStatus to a data loader of the backend system can result in having each of UpgradeABAPStatus, UpgradeJ2EEStatus, and UpgradeTR-EXStatus queued and asynchronously executed by the backend system (via the data loader). In one embodiment, the data loader queues an operation and generates an Execute method of the operation, which will consequently load and execute the operation. As the operation is executed, it may generate one or more outputs to a data publisher and/or a status publisher, which can provide the data to the SAPInstance as the data is available, which is asynchronous to the passing of the UpgradeASStatus.

In one embodiment, a system as described herein may be utilized with methods and apparatuses that enable generation of a tree that integrates with access interfaces. Such tree generation is described in general, followed by more detailed descriptions of the figures. In one embodiment, data access mechanisms provide business logic and data access interfaces that operate asynchronously with respect to the requesting user interface (UI). The data access is performed asynchronously with respect to the data access request and a UI update. In one embodiment, one or more publisher interfaces are provided to allow the data access mechanisms to directly control the UI in an asynchronous manner. The data access mechanisms generate a distributed object tree in response to receiving an indication of a distributed object and its related objects. The generation of the distributed object tree can be accomplished by the system via the indication of the distributed object and its related objects, and the developer does not need to custom integrate the objects into the tree. Additionally, the system allows for portability by having the data access mechanisms interact with one or more publisher modules, rather than needing specific methods for the UI itself.

In one embodiment, the tree is built via the instantiation of a distributed object tree class that includes logic and/or functionality to interface with the publishers. The interface functionality can then be automatically inherited. The interface functionality can include the functionality to implement a representation of the distributed object and its associated tree in the UI, which eliminates the need for the developer to develop such functionality. In one embodiment, update and status functionality is included within the data access mechanisms, and may be included within the distributed object tree class itself. Thus, update and refresh of the representation in the UI can be accomplished asynchronously and automatically as data access occurs, without the developer needing to develop specific routines for such functionality to occur.

In one embodiment, the system can be based on a model-view-controller (MVC) framework. The model or data/data access is represented in a generic manner. In one embodiment, a base tree node class is defined as the model component, where the class represents a generic graph. Every action or event processed on the data model (e.g., deleting an element or adding a tree of children) can be provided to the view via the controller components. In such an implementation, the (data and status) publishers represent the controller components. The view or the user interface can be directly managed by the model using the publisher interfaces. Thus, actions on the data model can be automatically updated in the view via the controllers (the publisher interfaces). Thus, the implementation effort for showing the data in a different MVC framework is reduced to a reimplementation of the publisher interface(s), without requiring rewriting the other MVC interface components.

Figure 1:
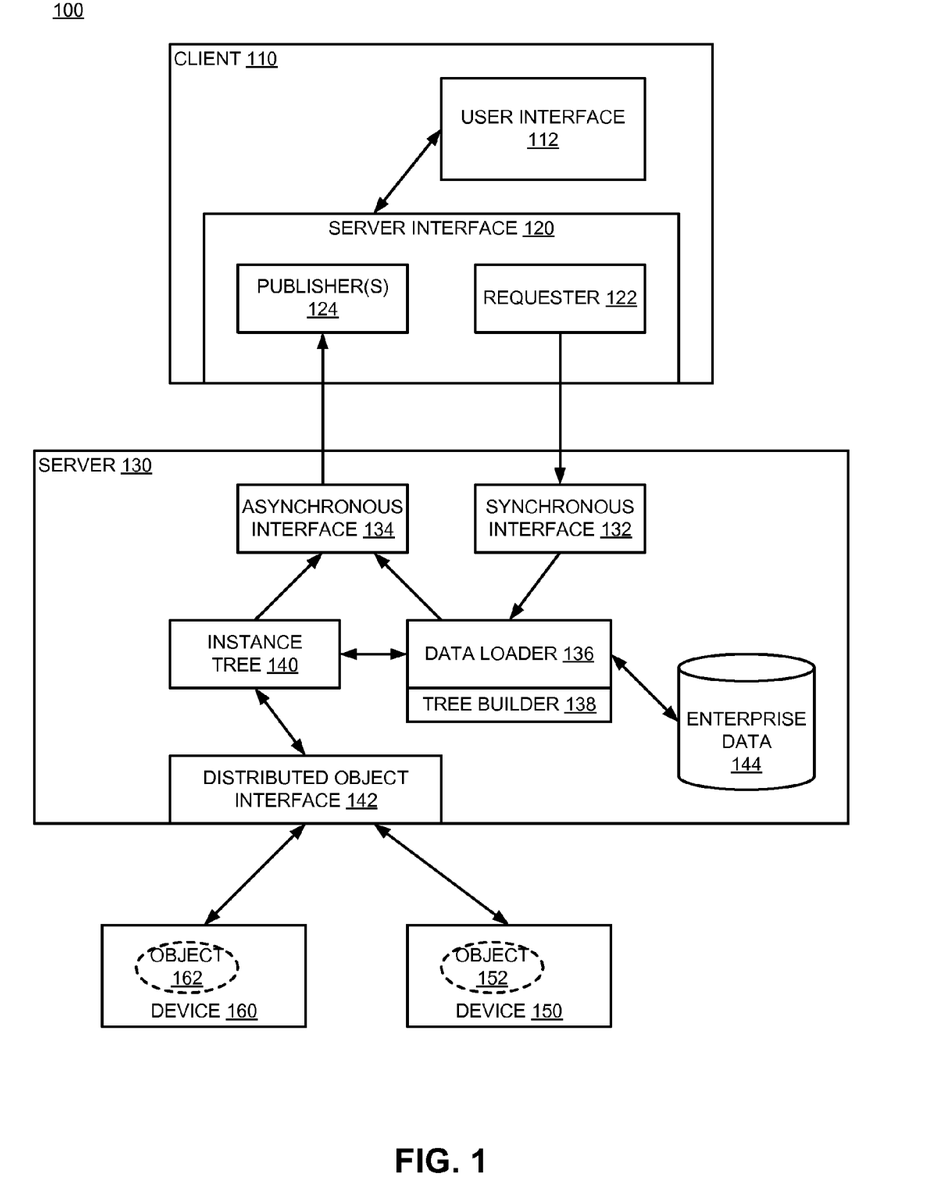
FIG. 1 is a block diagram of an embodiment of a system having a server with an asynchronous data loader.

FIG. 1 is a block diagram of an embodiment of a system having a server with an asynchronous data loader. System 100 represents an enterprise system, which may include any number of client devices, server, distributed objects, etc. Specifically depicted are client 110, server 130, and devices 150 and 160, which include objects 152 and 162, respectively. Client 110 represents a network device such as a desktop or laptop computer, a server, a handheld computing device, or other computing device that may access an enterprise network. Server 130 represents an enterprise server, which may be a standalone hardware device, or be an aggregation of hardware resources under a management system. For example, a rack of hardware equipment may be apportioned among multiple servers that execute on the hardware resources, each management system treating the allocated hardware resources as an integral device. Devices 150 and 160 may be data repositories (e.g., storage) on the enterprise, as well as other client devices, servers, etc. Devices 150 and 160 may even be the same physical and/or logical device in the enterprise.

Client 110 includes user interface 112 that enables interaction by a user with client 110. The user provides input into user interface 112, which generates one or more requests for functions to be executed. User interface 112 may include graphical and/or textual components, and may include a graphical user interface (GUI), and/or a command line interface (CLI). In one embodiment, user interface 112 provides a representation of an enterprise access instance. User interface 112 may generate the requests, or alternatively, provide the raw input data (e.g., text, clicks, etc., from a user) to server interface 120, which then generates the requests for one or more functions to be performed. In one embodiment, server interface 120 represents hardware and software that enables client 110 to access an enterprise backend. In another embodiment, server interface 120 represents the software system that provides a user interface to the enterprise. Server interface 120 may include one or more drivers or software modules, as well as ports and physical connections. In one embodiment, server interface 120 includes requester 122 and one or more publishers 124.

Requester 122 provides a communication mechanism with server 130. In one embodiment, requester 122 interacts synchronously with server 130, although asynchronous functionality could be implemented. Publisher 124 represents one or more components that provide data and/or status information into user interface 112 for display. In one embodiment, server interface 120 and user interface 112 represent components of a SWING GUI implementation. Swing is a JAVA GUI toolkit that includes GUI widgets that enable the building of user interfaces. JAVA and SWING are available from SUN MICROSYSTEMS, Inc., of Santa Clara, Calif. All marks used herein are the property of their respective owners. In another embodiment, server interface 120 and user interface 112 represent components of a STANDARD WIDGET TOOLKIT (SWT) available from ECLIPSE FOUNDATION of Ottawa, Ontario, Canada. Similarly to Swing, SWT enables the building of user interfaces.

A request is sent to server 130 from requester 122 and received at synchronous interface 132. In response to receiving the request, synchronous interface 132 provides the request to data loader 136. In one embodiment, the request represents a function call that is received at synchronous interface 132, and which triggers the performance of one or more operations. Data loader 136 queues the function and provides a reply via synchronous interface 132 to requester 122. When a request is generated, requester 122 may obtain control of user interface 112, which would prevent other tasks being performed by the user in the user interface. After receiving the reply that the function was received, requester 122 may release control of the user interface, allowing other tasks to be performed in the user interface while waiting for the requested function to be performed.

In one embodiment, data loader 136 can access asynchronous interface 134 to provide status information to user interface 112. Status information can indicate a length of time the execution of the operations are expected to take, what percentage of work has been executed, etc. Such information can be sent to client 110 via asynchronous interface 134, and displayed through publisher 124. Data loader 136 is also coupled to tree builder 138, which represents a worker node that can execute the operations queued by data loader 136. In one embodiment, data loader 136 initiates an execute method of a queued operation, which is then executed by tree builder 138. Tree builder 138 accesses one or more distributed objects 152, 162 through distributed object interface 142. In one embodiment, tree builder 138 receives an indication of a distributed object and builds instance tree 140 based on the distributed object and its children objects. The children can be discovered, for example, through receiving a list of children with the request, or via a lookup method, or accessing the object or enterprise data.

Data loader 136 and/or tree builder 138 initiate access to distributed objects, which are accessed. Data loader 136 and/or tree builder 138 initiate having the requested operations performed, which may include reading data, writing data, changing an attribute of the data object, etc. Any of a number of directory operations may be performed, for example, selecting a directory item (gaining access to the underlying data object), displaying details of a data object (reading the data object), displaying the details of a directory (reading multiple data objects, including relationships between the objects), etc. Data is returned to asynchronous interface 134 upon completion of execution of an operation, which data can then be displayed in user interface 112 via publisher 124.

In one embodiment, server 130 includes, or has access to enterprise data 144, which may include one or more objects (which may be base tree nodes). In one embodiment, enterprise data 144 includes relational information and can provide information regarding which objects are related or have relationships. Instance tree 140 represents the distributed object tree having an instance node or base tree node, with its children or related objects. The requested operations are performed on the distributed objects, and the distributed object tree structure can be changed in accordance with the operations performed. Thus, instance tree 140 can be a dynamic structure that represents the dynamic state of the underlying distributed objects, which can be changed in response to operations performed on the objects. Instance tree 140 is coupled to asynchronous interface 134, and sends data to asynchronous interface 134, which is then sent to publisher 124 of client 110.

Figure 2:
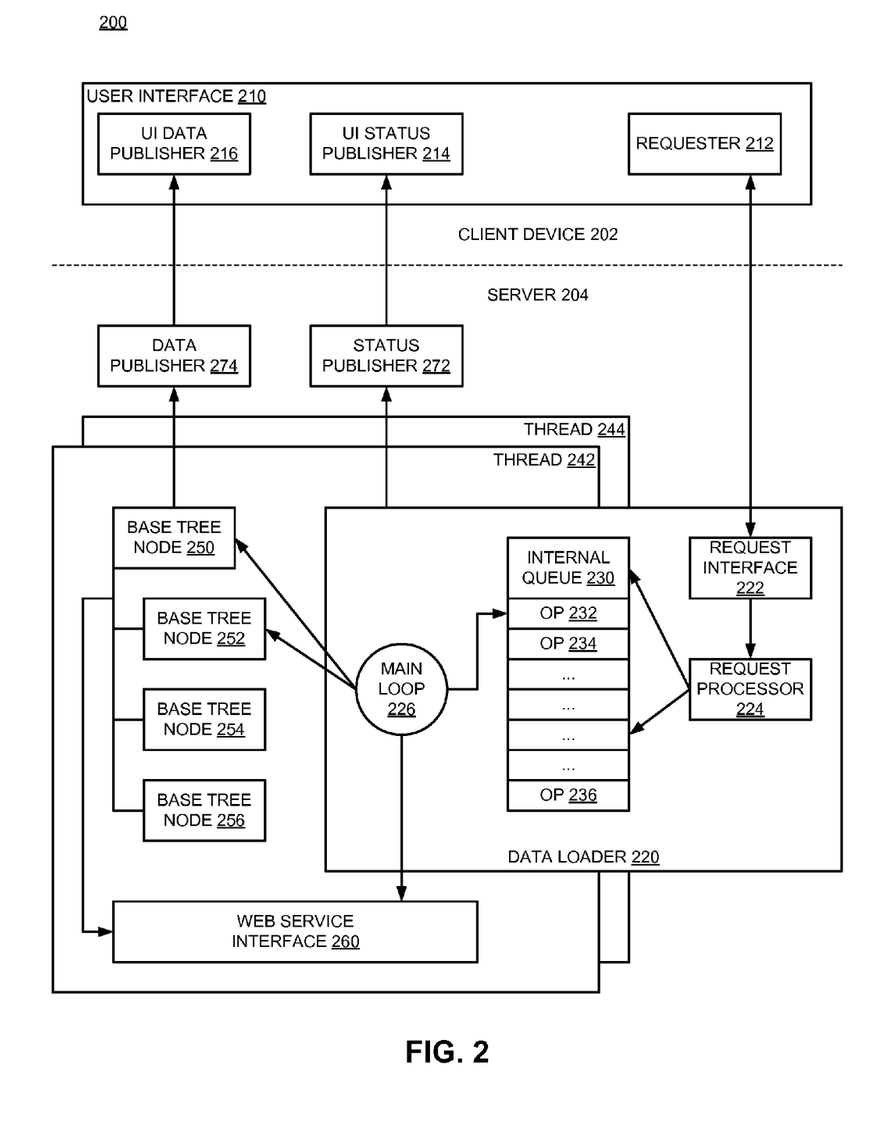
FIG. 2 is a block diagram of an embodiment of a system that provides asynchronous status and data updates to a remote user interface.

FIG. 2 is a block diagram of an embodiment of a system that provides asynchronous status and data updates to a remote user interface. System 200 represents a system comparable to system 100 of FIG. 1. System 200 includes client device 202 and server 204, which are examples of client 110 and server 130, respectively, of FIG. 1. Client device 202 represents a device that remotely accesses enterprise data, or accesses data that is stored in the enterprise separately from the device itself. Server 204 processes and responds to the requests of client device 202.

Client device 202 includes user interface (UI) 210. In one embodiment, UI 210 is implemented as a Swing application. Alternatively, UI 210 could be implemented as an SWT application, or some other application based on another toolkit or technology. UI 210 may include any number of components, among which may be requester 212, UI status publisher 214, and UI data publisher 216. Requester 212 represents a component from which a request for access to a distributed object may be generated. For example, requester 212 may be a frame, tree, table, etc. Requester 212 requests a function to be performed on a distributed object tree. In one embodiment, requesting the function is performed by invoking a function, such as Start, Stop, LoadChildren, etc.

The request is sent to data loader 220 of server 204. Request interface 222 of data loader 220 receives the request. Request interface 222 represents a communication channel, which may include hardware components of a communication link or a combination of hardware and software components (e.g., the connector, a port, a network interface circuit, a signal driver, etc.). Request interface 222 enables data loader 220 to communicate with user interface 210. The request is passed from request interface 222 to request processor 224, which may be separate from, or combined with, request interface 222. Request processor 224 may perform any of a number of tasks on the request, including verifying the format of the request, error checking, etc. In one embodiment, request processor 224 determines from the request one or more operations to execute to perform the function. For example, request processor 224 may generate a StartOperation, StopOperation, LoadOperation, etc., in response to receiving the function request. In one embodiment, determining the operations includes looking up which operations provide particular functions. Generally, a certain number of functions will be defined that can produce results for user interface 210. A request for an undefined function may generate an error. A function can be defined as having multiple operations to perform to achieve the result. The function, or its constituent elements (operations), is/are queued in internal queue 230 of data loader 220.

In one embodiment, request processor 224 receives information related to building the tree of base tree node 250. For example, requester 212 may indicate base tree nodes 252-256 (e.g., via sending a list), indicating such distributed objects as having a relationship with base tree node 250, and belonging in the tree. In one embodiment, request processor 224 loads tree information and/or a list of child nodes, such as from an enterprise database, which identify the elements of the distributed object tree.

Request processor 224 may invoke an Add(Operation) or similar method to queue an operation in internal queue 230. Such an invocation is represented by the arrow pointing to the label block of internal queue 230. Internal queue 230 may store operations in any order. Typically, a particular order is provided to the queue, which may be execution order and/or FIFO, and/or some other order. Many types of queuing and dequeuing/scheduling techniques are known and will not be explained herein. The other arrow from request processor 224 to internal queue 230 represents any of a number of other methods that may be performed with respect to a queued operation. For example, in one embodiment, data loader 220 tracks each queued operation (ops 232-236) and determines when to update a status of the operation to user interface 210. Thus, a Notify( ) method or other method, or some equivalent, can be performed.

Main loop 226 represents a main loop or logical flow of execution of data loader 220. Data loader 220 includes a flow control mechanism, which may be a main software loop that is performed, or other flow control, whether hardware or software. Main loop 226 may determine that an operation exists in internal queue 230, dequeue the operation, and cause it to be executed. The operation is executed in a background process, which may be a background thread. The background thread can be dedicated to the execution of one or more operations, or a background thread can be more general. In one embodiment, data loader 220 initiates execution of an operation in an existing, available thread. In another embodiment, data loader 220 invokes a new thread for one or more operations. Thus, executing the operation or initiating execution of the operation may include determining what thread in which to execute the operation. Data loader 220 may initiate execution of an operation (for example, op 232, which is pointed to by a scheduling mechanism) in thread 242 or thread 244. In one embodiment, a thread is initiated and exists for each instance of an enterprise data access application (e.g., SAPInstance as referred to above). Thus, thread 242 may be dedicated to operations on base tree node 250 that represents the instance, and thread 244 may be dedicated to operations on a different instance.

As mentioned above, base tree node 250 represents an instance of a data access application. In one embodiment, the tree of base tree node 250 is generated by data loader 220 in conjunction with performing one or more operations. Base tree node 250 has relationships with base tree nodes 252-256. For example, base tree nodes 252-256 can be children of base tree node 250. Each of the base tree nodes has a number of methods that are associated with the respective base tree node, and may be invoked in conjunction with implementing the operation. Base tree node 250 represents an node of an object tree, with the other objects related to base tree node 250 being represented underneath base tree node 250. One or more nodes of the tree may access a web service via web service interface 260. Web service interface 260 provides functionality for monitoring and/or controlling the instance represented by base tree node 250. An example web service interface could be SAPControlInterface available for SAP instances. Alternatively, web service interfaces available from ADOBE SYSTEMS INCORPORATED of San Jose, Calif., INTERNATIONAL BUSINESS MACHINES (IBM) CORPORATION of Armonk, N.Y., or others. The web service interface is dependent on the type of instance and/or data that is being retrieved.

Note that main loop 226 is illustrated with multiple arrows pointing to different components of FIG. 2. Each arrow represents a possible scenario or implementation detail associated with the interaction of data loader 220 with the background processes. For example, one arrow points to base tree node 250, which represents the instance in question. Data loader 220 may initiate an action in the instance, which may then independently act, either through accessing web service interface 260 and/or initiating an action in a related base tree node 252-256. As another example, data loader 220 can initiate an action in one of the related or associated base tree nodes, such as base tree node 252. Such an action can affect the distributed object tree. Initiating the action in base tree node 252 can also trigger an access to web service interface 260. As another example, the last arrow points to web service interface 260, indicating that data loader 220 may directly initiate an action in web service interface 260 to access a remote object. Data loader 220 initiates at least one action to execute the operation, and may initiate any of a combination of actions on the various components.

Consider an example where main loop 226 of data loader 220 initiates a method "Operation.execute( )," which is represented by any of the action arrows from main loop 226. Operation.execute( ) is dependent on the operation being initiated. For example, an operation such as StartOperation (SAPInstance) starts an SAPInstance, which could be initiated from main loop 226. In one embodiment, the operation StartOperation(SAPInstance) is contained by another Authorized Operation (which may be referred to as a "function" as used herein), which could, for example, display a Logon Dialog. Thus, multiple operations could be initiated from a single Authorized Operation. In another example of operations, a LoadOperation may simply execute and load the content of the node where the operation is. For example, a LoadOperation(SAPInstance) could be requested and queued just as it is by the data loader, which then asynchronously calls an execute method of the operation, which will consequently load the content of the identified SAPInstance.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 3:
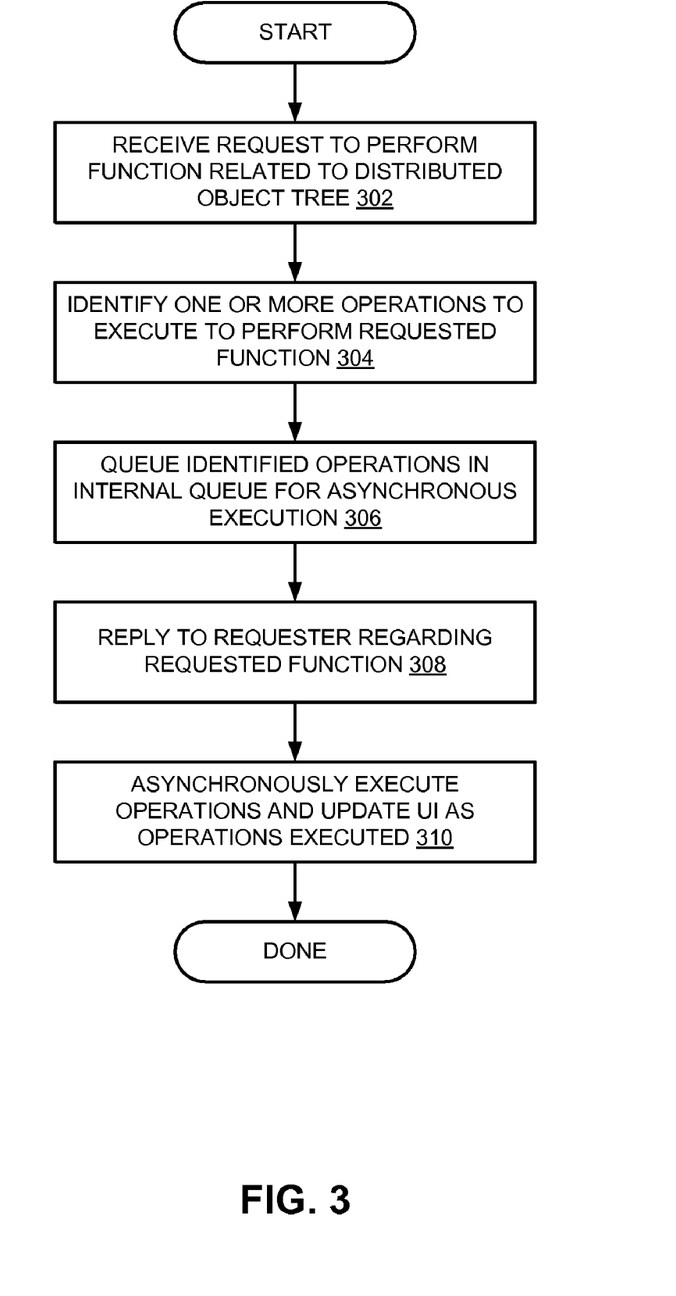
FIG. 3 is a flow diagram of an embodiment of a process for replying synchronously to a request for a function on a distributed object tree, and performing the function asynchronously.

FIG. 3 is a flow diagram of an embodiment of a process for replying synchronously to a request for a function on a distributed object tree, and performing the function asynchronously. Flow diagrams as illustrated herein provide examples of sequences of various process actions. Although shown in a particular sequence or order, unless otherwise specified, the order of the actions can be modified. Thus, the illustrated implementation should be understood only as an example, and the process can be performed in a different order, and some actions may be performed in parallel. Additionally, one or more action can be omitted in various embodiments of the invention; thus, not all actions are required in every implementation. Other process flows are possible.

A data loader receives a request to perform a function related to a distributed object tree of enterprise data, 302. The request is received from a client device. In one embodiment, the data loader has a synchronous interface with the client device, and the request is acknowledged synchronously. The function can include multiple operations, or a single operation to be performed. The data loader identifies one or more operations to execute to perform the requested function, 304.

The data loader queues the identified operations in an internal queue for asynchronous execution, 306. The operations can be queued in execution order, or some other order. In one embodiment, a FIFO scheme is used to queue and dequeue the operations. The operations are to be executed asynchronously from the request. Thus, a user interface of the client device does not await a response prior to releasing control back to a user. Such operation is contrasted with traditional remote interfaces that operate synchronously with respect to the execution of the function. The asynchronous operation allows for improved operation of the user interface.

The data loader replies to the requester regarding the requested function, 308, in response to the queuing of the function. In one embodiment, the reply is synchronous, as discussed above. The operation may be queued for a matter of a couple of execution cycles, for example if no other operations are currently queued, or may be queued for a much longer period as other operations are performed. The data loader asynchronously dequeues and executes the operations. As operations are executed, the UI is updated, 310. The data loader may execute an operation or initiate execution of the operation. In one embodiment, the data loader simply calls a method of a data object in the distributed object tree, which invokes execution of the requested function/operation. Note that an enterprise server includes one or more processors that execute operations. Also, specialized hardware could execute operations. Executing the operations could include invoking a tree instance, a data object in the tree, and/or a web service interface.

Figure 4:
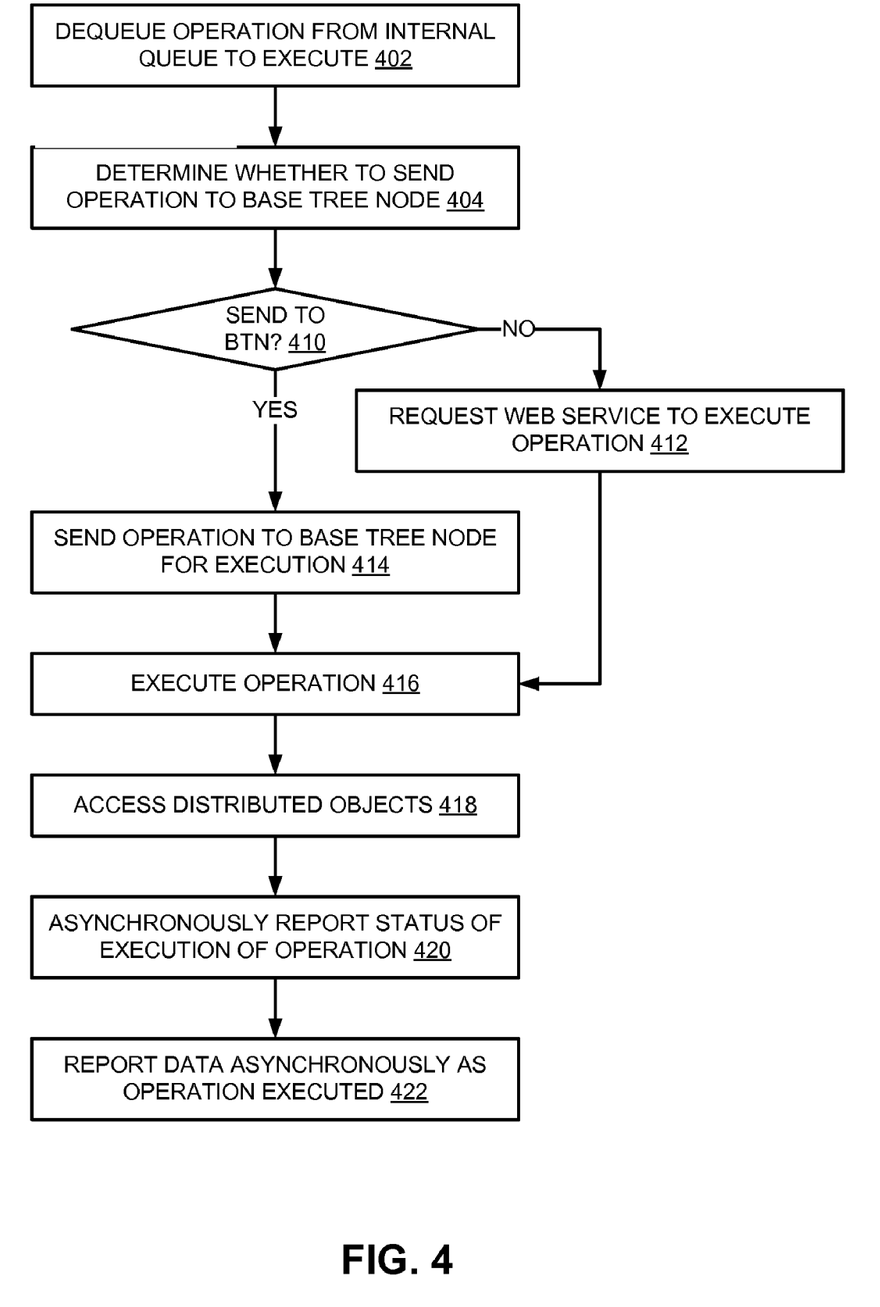
FIG. 4 is a flow diagram of an embodiment of a process for asynchronously performing a function requested from a remote interface.

FIG. 4 is a flow diagram of an embodiment of a process for asynchronously performing a function requested from a remote interface. In one embodiment, a data loader receives a request to perform a function on a distributed object tree, and queues multiple operations in an internal queue to execute the requested function. The data loader dequeues an operation from the internal queue to execute, 402. The dequeuing is performed by a main execution flow. In one embodiment, the main execution flow of the data loader is a main thread, and operations are dequeued to be executed in one or more background threads.

The data loader determines whether to execute the operation by sending it directly to the base tree node thread for execution, or whether another action should be performed to execute the operation, 404. If the data loader is not to send the operation directly to the base tree node, 410, the data loader may perform another action, such as requesting a web service to execute the operation, 412. Thus, the data loader may interface directly with a web service interface. In one embodiment, the operation is to be executed remotely from the server on which the data loader is executing, and therefore, the data loader causes the operation to be executed remotely via the web service interface. If the operation is to be sent directly to the base tree node for execution, the data loader sends the operation to the base tree node for execution, 414.

Whether via the base tree node background process, or via remote device, the data loader causes the operation to be executed, and can thus be considered to execute the operation, 416. As part of the operation, one or more distributed objects may need to be accessed, 418. The distributed objects may or may not already be loaded into the memory of the server and be available for access. If the objects are not already loaded, such a load operation may be performed in conjunction with the operation. In one embodiment, the data object is not instantiated in the base tree node background process, but may be accessed locally to the device on which it is stored.

In contrast to other remote interfaces, the data loader as described herein can asynchronously dequeue and execute the operation. Asynchronous refers to asynchronous with respect to the request for the function. The operation can be dequeued as the queue is emptied, and/or as resources become available to execute the operation. The asynchronous execution of the operation of by the data loader works in conjunction with asynchronous reporting or publishing by the data loader to the requesting user interface. In general, publishing may be divided into the two categories of "status" and "data." Status reporting can indicate whether the execution of the function has begun, and if so, what percentage of execution has been completed. The skilled reader is generally familiar with the methods of reporting status, and such methods will not be discussed in detail herein. Data reporting refers generally to returning data generated as a result of the execution of the operation(s). Generally, the requesting remote interface expects a result returned in response to the request. Publishing the data refers to returning data (rather than a mere acknowledgement or status indication) in response to the request. The data loader as described herein asynchronously reports status of the execution of the operation, 420, and asynchronously reports data as the operation is executed, 422. Thus, true asynchronous execution is achieved by the data loader.

Besides what is described herein, various modifications may be made to the disclosed embodiments and implementations of the invention without departing from their scope. Therefore, the illustrations and examples herein should be construed in an illustrative, and not a restrictive sense. Additional material attached hereto provides further details and more concepts that are part of this disclosure. The scope of the invention can be identified based on the materials herein, as well as the claims that follow.

What is claimed is:

1. On a server, a method comprising:

receiving from a user interface (UI) executing on a computing system separate from the server, a request to perform a function on a distributed object tree hosted by the server;

queuing the function for execution;

sending a reply to the request in response to queuing the function, the reply sent synchronously with respect to the request from the UI;

executing the function in a background process asynchronously with respect to the request from the UI; and updating a display component of the UI as the function is executed, and asynchronously with respect to the request from the UI.

2. The method of claim 1, wherein receiving the request from the UI comprises:

receiving the request from a UI having one or more of a command line interface (CLI) or a graphical user interface (GUI).

3. The method of claim 1, wherein the server is an enterprise server, and wherein receiving the request from the UI comprises:

receiving the request from a client user system that is remote from the server.

4. The method of claim 1, wherein receiving the request to perform the function comprises:

receiving a request to perform one or more of selecting a directory, displaying details of a directory, or displaying details of a data object.

5. The method of claim 1, wherein queuing the function further comprises:

generating one or more operations to perform the function; and queuing the one or more operations for execution.

6. The method of claim 5, wherein queuing the operations for execution further comprises:

queuing the one or more operations in an execution order.

7. The method of claim 6, wherein queuing the operations in the execution order comprises:

queuing the one or more operations in a first-in, first-out order.

8. The method of claim 1, wherein executing the function comprises:

triggering execution of the function in conjunction with building an instance tree.

9. The method of claim 1, wherein updating the display component of the UI as the function is executed further comprises:

invoking a background thread from a main thread, wherein the main thread manages execution of the function, and the background thread updates data information resulting from execution of the function to the display component of the UI, the updating by the background thread performed independently of execution by the main thread.

10. The method of claim 9, wherein updating the display component of the UI as the function is executed further comprises:

updating status information to the UI from the main thread.

11. An article of manufacture comprising a computer readable storage medium having content stored thereon that represents instructions, which when executed cause a machine to perform operations including:

receiving, at a server from a user interface (UI) executing on a computing system separate from the server, a request to perform a function on a distributed object tree hosted by the server;

identifying one or more operations for executing the function;

queuing the one or more operations;

sending a reply to the request in response to queuing the operations, the reply sent synchronously with respect to the request from the UI;

executing the operations in one or more background threads asynchronously with respect to the request from the UI; and updating a display component of the UI as the operations are executed, and asynchronously with respect to the request from the UI.

12. The article of manufacture of claim 11, wherein the content for receiving the request to perform the function comprises content for receiving a request for performing one or more of reading a distributed data object, writing a distributed data object, determining a relationship of a distributed data object with another distributed data object, or changing an attribute of a distributed data object.

13. The article of manufacture of claim 11, wherein the content for queuing the operations comprises content for queuing the one or more operations in an execution order.

14. The article of manufacture of claim 11, wherein the content for executing the one or more operations in one or more background threads further comprises content for initiating execution of an operation in a main thread; and completing execution of the operation in a background thread.

15. The article of manufacture of claim 11, further comprising content for invoking a background thread for each operation from a main thread, the main thread to manage operation distribution and the background threads to execute the operations.

16. An enterprise server comprising:

a memory device to store a distributed object tree hosted by the enterprise server;

a data loader to receive a request from a user interface (UI) executing on a computing system separate from the enterprise server to perform a function on the distributed object tree, queue an operation that represents at least a portion of the function in response to receiving the request, send a synchronous reply to the request in response to queuing the operation, the reply sent synchronously with respect to receiving the request from the UI, dequeue the operation, and initiate execution of the operation in a background process associated with the distributed object tree, the execution of the operation initiated and performed asynchronously with respect to the receiving of the request; and an update publisher coupled to the data loader, to receive a result of the execution of the operation, and update the UI from which the request was generated with the result of the execution, the updating asynchronous with respect to receiving the request from the UI.

17. The enterprise server of claim 16, wherein the data loader dequeues and initiates execution of the operation from a main loop of a main thread, including invoking the background process.

18. The enterprise server of claim 16, wherein the data loader initiates the execution of the operation, including invoking an execute method associated with a distributed object of the distributed object tree.

19. The enterprise server of claim 16, wherein the update publisher further comprises:
   a status publisher to update a status of execution of the function to the UI; and
   a data publisher to provide data in response to the execution of the operation.

* * * * *